(12) United States Patent
Yu et al.

(10) Patent No.: US 11,523,372 B2
(45) Date of Patent: Dec. 6, 2022

(54) METHOD AND APPARATUS FOR LATENCY REDUCTION IN EV2X

(71) Applicant: LENOVO (BEIJING) LIMITED, Beijing (CN)

(72) Inventors: Xiaodong Yu, Beijing (CN); Haipeng Lei, Beijing (CN); Jing Han, Beijing (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 137 days.

(21) Appl. No.: 16/969,148

(22) PCT Filed: Feb. 11, 2018

(86) PCT No.: PCT/CN2018/076266
§ 371 (c)(1),
(2) Date: Aug. 11, 2020

(87) PCT Pub. No.: WO2019/153298
PCT Pub. Date: Aug. 15, 2019

(65) Prior Publication Data
US 2021/0045089 A1   Feb. 11, 2021

(51) Int. Cl.
*H04W 72/02* (2009.01)
*H04W 4/40* (2018.01)
(Continued)

(52) U.S. Cl.
CPC ............ *H04W 72/02* (2013.01); *H04W 4/40* (2018.02); *H04W 72/0493* (2013.01); *H04W 74/0808* (2013.01); *H04W 92/18* (2013.01)

(58) Field of Classification Search
CPC ... H04W 72/02; H04W 4/40; H04W 72/0493; H04W 74/0808; H04W 92/18;
(Continued)

(56) References Cited

U.S. PATENT DOCUMENTS

2019/0150197 A1* 5/2019 Sheu ................ H04W 72/1242
370/329
2019/0182840 A1* 6/2019 Feng ................ H04W 74/0816
(Continued)

FOREIGN PATENT DOCUMENTS

WO    2017001219 A1    1/2017
WO    2017160070 A1    9/2017
WO    WO-2017171523 A1 * 10/2017 ......... H04L 27/0006

OTHER PUBLICATIONS

Samsung, "Mode-4supportinV2XCA",R1-1720249,3GPPTSGRANWG1#91,Nov. 27-Dec. 2017,pp. 1-6. (Year: 2017).*
(Continued)

*Primary Examiner* — Ayaz R Sheikh
*Assistant Examiner* — Louis Samara
(74) *Attorney, Agent, or Firm* — Kunzler Bean & Adamson

(57) ABSTRACT

Method and apparatus for reduction of latency between the time when packets arrive at Layer 1 and the time when resource is selected for transmission are disclosed. One method of the apparatus for latency reduction includes excluding resource from a resource set for packets transmission on SL based on at least one of parameters which are determined according to a latency requirement for the packets, wherein the parameters comprise a required percentage of the candidate resource in the resource set, maximum power threshold of interference signal, and maximum number of times for increasing power threshold of interference signal.

18 Claims, 6 Drawing Sheets

(51) Int. Cl.
*H04W 72/04* (2009.01)
*H04W 74/08* (2009.01)
*H04W 92/18* (2009.01)

(58) Field of Classification Search
CPC ............. H04W 76/15; H04W 72/0413; H04W 72/087; H04W 72/1289; H04W 72/10; H04W 74/0816; H04L 5/0055; H04L 47/2475; H04L 27/0006
See application file for complete search history.

(56) References Cited

U.S. PATENT DOCUMENTS

| | | | |
|---|---|---|---|
| 2019/0191290 A1* | 6/2019 | Poitau | H04W 72/0413 |
| 2019/0246420 A1* | 8/2019 | Park | H04W 72/087 |
| 2020/0015144 A1* | 1/2020 | Kedalagudde | H04W 40/02 |
| 2020/0287691 A1* | 9/2020 | Baldemair | H04L 5/0055 |
| 2020/0336973 A1* | 10/2020 | Niu | H04W 72/1289 |
| 2021/0211923 A1* | 7/2021 | Wallentin | H04L 47/2475 |
| 2022/0015116 A1* | 1/2022 | Chen | H04W 72/10 |

OTHER PUBLICATIONS

Lenovo, Motorola Mobility, "Discussion on latency reduction for V2X", R1-1719751,3GPP TSG RAN WG1 Meeting 91, Nov. 27-Dec. 1, 2017, pp. 1-4 (Year: 2017).*

Ranadive, A. • Gavrilovska, A. • Schwan, K., Latency-Aware Scheduling in Virtualized Environments with High Performance Fabrics, 2011 IEEE International Conference on Cluster Computing (pp. 45-53) (Year: 2011).*

Lenovo, "Discussion on latency reduction for V2X", R1-1719751, Lenovo, Motorola Mobility, 3GPP TSG RAN WG1 Meeting 91, Nov. 27-Dec. 1, 2017, pp. 1-4.

Intel, "Resource Selection latency Reduction for LTE V2V Sidelink Communication", R1-1720036, Intel Corporation, 3GPP TSG RAN WG1 Meeting #91, Nov. 27-Dec. 1, 2017, pp. 1-5.

PCT/CN2018/076266, "International Search Report and the Written Opinion of the International Search Authority" ISA/CN, State Intellectual Property Office of the P.R. China, Oct. 25, 2018, pp. 1-8.

Molina-Masegosa Rafael et al., "LTE-V for Sidelink 5G V2X Vehicular Communications: A New 5G Technology for Short-Range Vehicle-to-Everything Communications", IEEE Vehicular Technology Magazine, IEEE, US, Dec. 1, 2017, pp. 1-10.

ZTE, "Considerations for latency reduction", R1-1713079, 3GPP TSG RAN WG2 Meeting #100, Nov. 27-Dec. 1, 2017, pp. 1-3.

ASTRI, TCL Communication Ltd., Resource selection for V2X systems supporting CA, R1-1717415, 3GPP TSG RAN WG1 Meeting 90bis, Oct. 9-13, 2017, pp. 1-5.

Lenovo, Motorola Mobility, "Discussion on latency reduction for V2X", R1-1719751, 3GPP TSG RAN WG1 Meeting 91, Nov. 27-Dec. 1, 2017, pp. 1-4.

Samsung, "Mode-4 support in V2X CA", R1-1720249, 3GPP TSG RAN WG1 #91, Nov. 27-Dec. 1, 2017, pp. 1-6.

* cited by examiner

METHOD AND APPARATUS FOR LATENCY REDUCTION IN EV2X

FIELD

The subject matter disclosed herein relates generally to wireless communication and more particularly relates to latency reduction in eV2X.

BACKGROUND

The following abbreviations and acronyms are herewith defined, at least some of which are referred to within the following description.

Third Generation Partnership Project ("3GPP"), Channel Busy Ratio ("CBR"), Device-to-Device ("D2D"), further enhancement Device-to-Device ("feD2D"), Downlink Control Information ("DCI"), Downlink ("DL"), Evolved Node B ("eNB"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Modulation and Coding Scheme ("MCS"), Machine Type Communication ("MTC"), Physical Downlink Control Channel ("PDCCH"), Physical Downlink Shared Channel ("PDSCH"), ProSe Per Packet Priority ("PPPP"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Radio Network Temporary Identity ("RNTI"), Radio Resource Control ("RRC"), Reference Signal Receiving Power ("RSRP"), Receive Signal Strength Indicator ("RSSI"), Receive ("RX"), Scheduling Assignment ("SA"), Sidelink Control Information ("SCI"), Signal to Interference plus Noise Ratio ("SINR"), Sidelink ("SL"), Semi-Persistent Scheduling ("SPS"), Time Division Duplex ("TDD"), Time-Division Multiplexing ("TDM"), Transmission Time Interval ("TTI"), Transmit ("TX"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X"), Vehicle-to-Infrastructure/Network ("V2I/N"), Vehicle-to-Pedestrian ("V2P").

In Release 15 (Rel-15), it is expected to enhance the Cellular-based V2X services (V2V, V2I/N, and V2P) as identified in the 3GPP meetings.

One of the objectives for this study is the reduction of latency between the time when packets arrive at Layer 1, which is also referred as physical layer herein, and the time when resource is selected for transmission, as regarding to UE using mode 4. The requirements for the latency vary from 3 ms to 100 ms as defined in the 3GPP meetings. UEs using mode 3 and mode 4 are also referred as mode 3 UE(s) and mode 4 UE(s) respectively herein. Particularly, Radio resource for Mode 3 UE is scheduled by eNB, while radio resource for Mode 4 UE, which is out of an coverage of eNB or configured out of there, is autonomously selected from a resource set by itself, as defined in Release 14 (Rel-14).

In another aspect, The goal of reducing the latency not only need a support for latency requirements, but also a consideration for an enough percentage of the candidate resource in the resource set as well as good channel condition of the candidate resource for collision avoidance.

BRIEF SUMMARY

Enhancements to reduction of the latency between the time when packets arrive at Layer 1 and the time when resource is selected for transmission requires a tradeoff between the percentage of the candidate resource in the resource set and the channel quality such as SINR for the candidate resource. For example, in order to meet the latency requirements of 10 ms or less, a simple solution is to reduce time interval as resource (re)selection window. In that way, if the windows size is shorten to 10 ms or less, the percentage of the candidate resource in the resource set may not meet 20%, i.e., the default percentage requirement. However, in another aspect, if the percentage is obsessively guaranteed by increasing allowed power of interference signal, the lower SINR may be resulted in for the candidate resource. From a perspective of the whole system, it may reduce the coverage of sidelink transmission and increase the collision probability for multiple UEs in V2X.

Method and apparatus for reduction of latency between the time when packets arrive at Layer 1 and the time when resource is selected for transmission are disclosed. One method of mode 4 UE for latency reduction includes excluding resource from a resource set for packets transmission on SL based on at least one of parameters which are determined according to a latency requirement for the packets, wherein, the parameters comprise a required percentage of the candidate resource in the resource set, maximum power threshold of interference signal, and maximum number of times for increasing power threshold of interference signal.

Further, in response to a percentage of the candidate resource in the resource set having not reached the required percentage, the power threshold of interference signal is increased until one of the required percentage of the candidate resource in the resource set, the maximum power threshold of interference signal and/or the maximum number of times for increasing power threshold of interference signal is reached.

Further, the parameters are further determined based on at least one of Channel Busy Ratio (CBR) and ProSe Per Packet Priority (PPPP).

The method and apparatus herein consider a tradeoff between the percentage of the candidate resource in the resource set and the channel quality such as SINR for the candidate resource, as regarding to the requirements for latency between the time when packets arrive at Layer 1 and the time when resource is selected for transmission. Further, the physical layer of mode 4 UE can report a used percentage of the candidate resource in the resource set, a used power threshold of interference signal, a used number of times for increasing power threshold of interference signal and/or an index corresponding to a set of the determined parameters to higher layer thereof, so that the higher layer can set transmission parameters based on wireless conditions.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1:
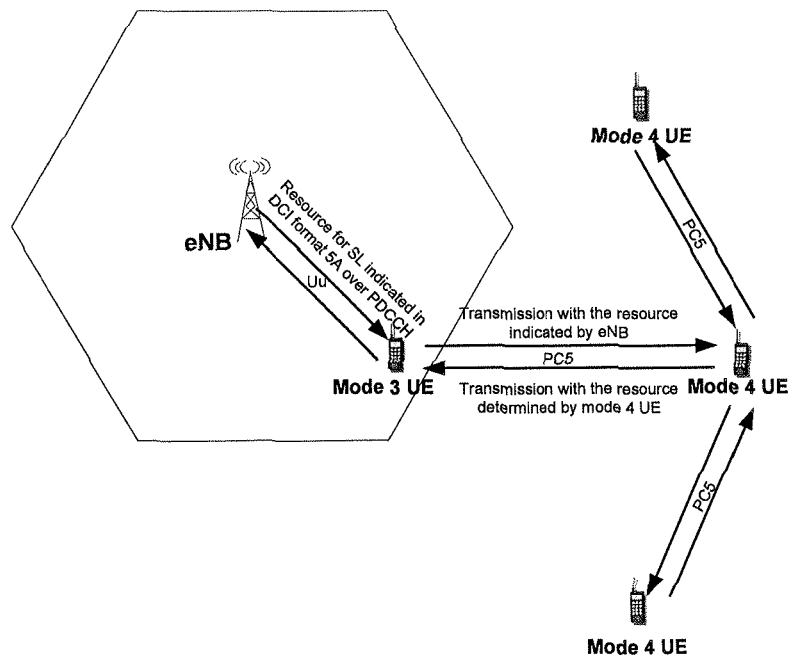
FIG. 1 is a schematic diagram illustrating transmission in V2X.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred to hereafter as code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

The goal of reducing the latency in eV2X should consider both event-triggered and periodic transmission traffic types. For example, two sets of platooning performances requirements are supported in the proposal for 3GPP Rel-15:

Set 1: the distance between vehicles for normal density platooning may be larger than 2 meters. When the platoon moves at 100 km/h, vehicles move 1 meter in 36 ms. Considering the round-trip-time and processing delay, message transmission frequency up to 40 Hz, which is translated into 25 ms end-to-end latency with message sizes of around 300-400 bytes, should be supported.

Set 2: the distance between vehicles for high density platooning is 1 meter. When the platoon moves at 100 km/h, vehicles move 1 meter in 36 ms. Considering round-trip-time and processing delay, message transmission frequency up to 100 Hz, which is translated into at least 10 ms latency with message sizes of around 50-1200 bytes, should be supported.

That is, two Key Performance Indicators (KPI) are required in eV2X according to the above two sets: triggered and periodic transmission of small data packets (e.g. 300-400 bytes) should be supported; and end-to-end latency of 10 ms for message transfer among a group of UEs should be supported.

Thus, enhancements to reduction of the latency between the time when packets arrive at Layer 1 and the time when resource is selected for transmission should apply different latency requirement to different packets. Disclosed herein are methods, apparatuses, and systems that provide a technical solution of resource exclusion from a resource set for packets transmission on SL based on at least one of parameters which are determined according to a latency requirement for the packets. As described hereinafter, the parameters comprise a required percentage of the candidate resource in the resource set, maximum power threshold of interference signal, and maximum number of times for increasing power threshold of interference signal. Further, according to one embodiment, CBR and/or PPPP are also considered to determine the applied values of the parameters along with the latency requirement for the packets. It would be appreciated the disclosed enhancements is implemented on a mode 4 UE, although these parameters may be preconfigured from a base station such as eNB or a higher layer of the mode 4 UE.

FIG. 1 is a schematic diagram illustrating transmission in V2X. As shown in FIG. 1, a mode 3 UE is in the coverage of an eNB, while mode 4 UEs are out of the coverage of an eNB or configured out of there. It is noted that mode 4 UEs may be in the coverage of another eNB which is not shown in FIG. 1, but is non-RRC connection state for the shown eNB. The resource on SL for the mode 3 UE is scheduled by the eNB using DCI format 5A over PDCCH. For example, the eNB schedules a SL transmission resource with a SL SPS configuration index in the case that the resource allocation for SL transmission is based on SPS. The mode 3 UE performs SL transmission using the scheduled resource allocated by the eNB on PC5 interface. The mode 4 UEs autonomously select resource for SL transmission from a resource pool, and perform SL transmission with the selected resource on PC5 interface. Thereby, it is required for the mode 4 UEs to monitor the conditions of signal transmitted on SL in order to select candidate resources from a resource set by the physical layer (also referred as Layer 1) thereof in an efficient way.

Figure 2:
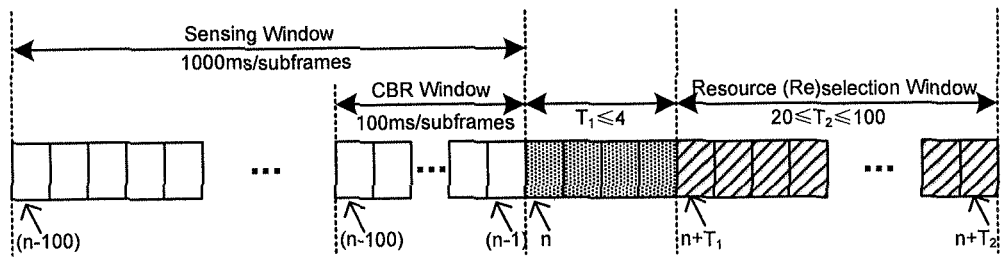
FIG. 2 is a schematic diagram illustrating signal sensing and resource (re)selection on a mode 4 UE.

FIG. 2 is a schematic diagram illustrating signal sensing and resource (re)selection on a mode 4 UE. As shown in FIG. 2, when requested by higher layers in subframe n for data transmission, the physical layer of mode 4 UE determines a resource for PSSCH transmission. Particularly, the UE assumes that any resource within (re)selection window of the time interval $[n+T_1, \ldots, n+T_2]$ may be the candidate resource, wherein the selections of $T_1$ and $T_2$ are up to UE implementations within $T_1 \leq 4$ ms and 20 ms$\leq T_2 \leq$100 ms. The selection of $T_2$ should meet the latency requirement. It would be noted that the duration of 1 subframe is 1 ms, thus the resource (re)selection window can be represented as subframes $[n+T_1, \ldots, n+T_2]$. In order to select resource with an acceptable quality, the UE shall monitor a sensing window of subframes [n−1000, n−999, . . . n−1] (or time interval in milliseconds) except for those in which its transmissions occur. Further, the UE performs the procedure for resource selection based on the measured RSRP and/or S-RSSI for PSSCH as well as the decoding for PSCCH in these subframes, as described in FIG. 3.

Additionally, the mode UE monitors subframes [n−100, . . . , n−1] (or time interval [n−100, . . . , n−1] in milliseconds) to learn CBR which reflects the extent of channel busy, as described hereinafter.

Figure 3:
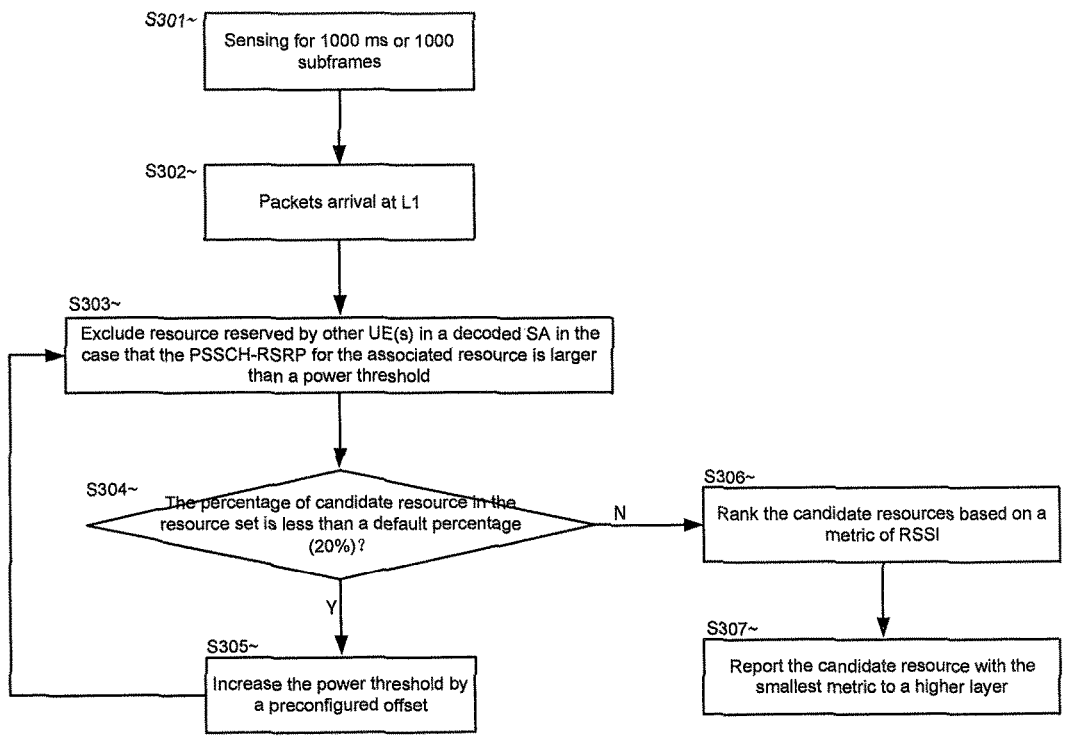
FIG. 3 is a call flow illustrating a selection of candidate resource according to the first embodiment.

FIG. 3 is a call flow illustrating a selection of candidate resource according to the first embodiment. As shown in FIG. 3, in S301, the mode 4 UE keeps sensing for 1000 ms or 1000 subframes. Particularly, the UE monitors the power and/or strength of signals in subframes [n−1000, n−999, . . . , n−1] except for those in which its transmissions occur, that is because that the power and/or strength of signals in sensing window can reflect that of interference signal in the resource (re)selection window according to a predefined mapping relationship. For example, the possible power of the interference signal in the time interval/subframes $[n+T_1, \ldots, n+T_2]$ can be reflected by the measured RSRP for time interval/subframes [n−1000, n−999, . . . , n−1].

In S302, the physical layer of the mode 4 UE receives a request for data transmission from the higher layer thereof.

In S303, the UE learns reserved resource for other UE(s) from a decoded SA, which has a collision with the resource set in the time interval $[n+T_1, \ldots, n+T_2]$. The SL transmission from other UE(s) is regarded as an interference to the transmission of the mode 4 UE. However, the SL transmission in reserved resource from other UE(s) may have limited or fewer impacted on that of the mode 4 UE, for example, in the case of different transmission directions.

The mode 4 UE thus deduces the power impact of the interference signal in the reserved resource from the PSSCH-RSRP for the associated resource in the time interval [n−1000, n−999, . . . , n−1], according to the predefined mapping relationship between the sensing and resource (re)selection window. In the case that the PSSCH-RSRP for the associated resource is larger than a default power threshold such as 5 dB, the UE excludes the reserved resource for other UE(s) from the resource set in the (re)selection window, wherein the remained resource after the exclusion is also referred as candidate resource herein.

In S304, if the percentage of candidate resource in the resource set is less than a default percentage such as 20% after the exclusion (Y in S304), the procedure continues to S305, wherein, the power threshold is increased by a preconfigured offset such as 3 dB. Then, the procedure returns back to S303, wherein, the UE excludes the reserved resource for other UE(s) from the resource set in the (re)selection window in the case that the PSSCH-RSRP for the associated resource in the sensing window is larger than the increased power threshold. In S304, the UE decides again if the percentage of candidate resource in the resource set is less than the default percentage after the exclusion.

In response to the percentage of the candidate resource in the resource set having not reached the default percentage, the power threshold is increased until the default percentage is reached. When the default percentage is reached (N in S304), the procedure continues to S306, wherein, the mode 4 UE ranks the candidate resources in the resource set based on the measured strength of the signal in the associated resources in sensing window, such as a metric of RSSI.

In S307, the physical layer of mode 4 UE reports the candidate resource with the smallest metric to a higher layer. According to one embodiment, the mode 4 UE randomly selects the transmission resource from the reported candidate resource with the acceptable metric.

It is obvious that the percentage of the candidate resource in the resource set is a fix value in the first embodiment without consideration for different types of packets. In that way, it's possible that a lower SINR may be resulted in for the candidate resource. Disclosure herein provides a technical solution of applying different parameters according to the latency requirement for packets.

Figure 4:
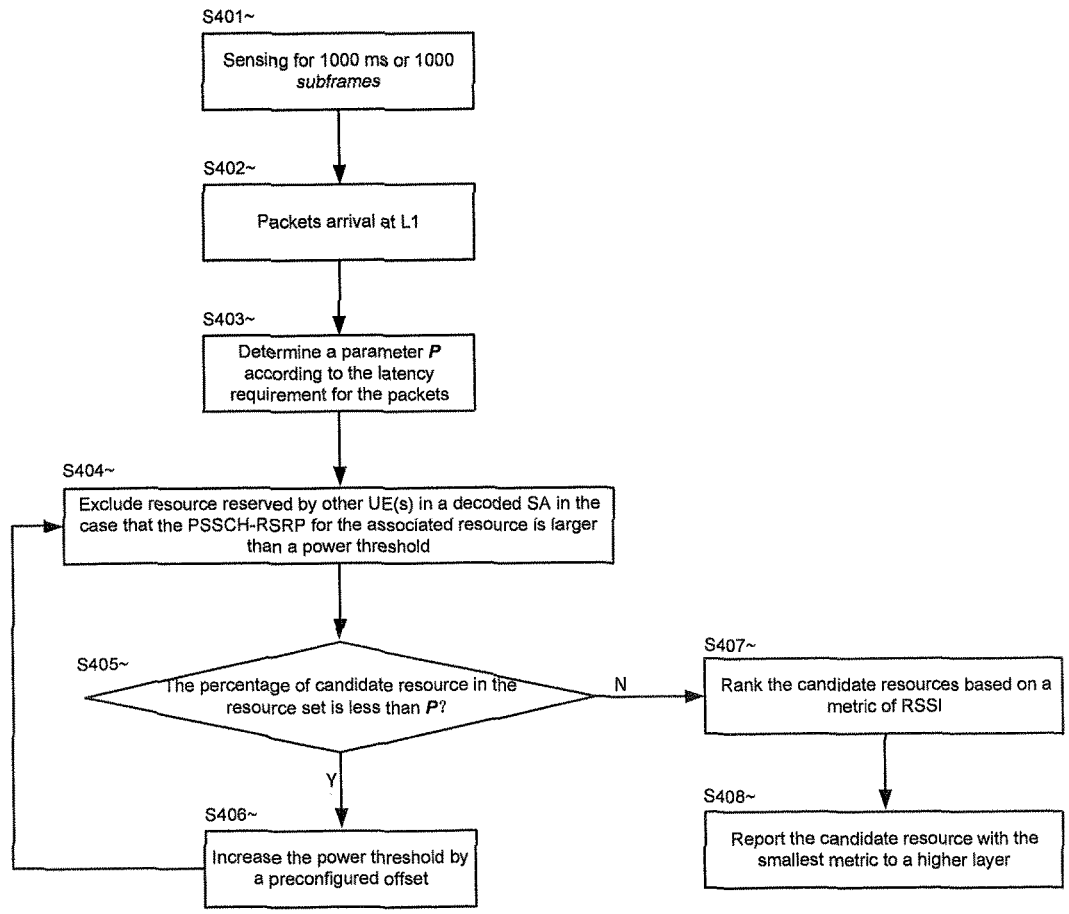
FIG. 4 is a call flow illustrating a selection of candidate resource according to the second embodiment.

FIG. 4 is a call flow illustrating a selection of candidate resource according to the second embodiment. Steps of S401 and S402 are similar with steps of S301 and S302, respectively, therefore the description thereof are omitted for the purpose of brevity.

In S403, the mode 4 UE determines a parameter P, which is a required percentage of the candidate resource in the resource set, according to the latency requirement for the packets to be transmitted on SL. The longer the required latency is, the larger the parameter P is, that is because more candidate resource can be selected for a longer required latency. According to another embodiment, the required percentage of the candidate resource in the resource set is determined by a default percentage and a scaling factor for percentage corresponding to the latency requirement for the packets. For example, the required percentage is a product of the default percentage such as 20% and the scaling factor for percentage which is referred as p. Table 1 is an example of the values for P and p for different values for the required latency.

TABLE 1

The Required Percentage vs. Latency Requirement

| latency requirement | Required percentage of the candidate resource in the resource set (P) | Scaling factor for percentage (p): default percentage = 20% |
| --- | --- | --- |
| 20 ms | 20% | 1 |
| 10 ms | 10% | 0.5 |
| 5 ms | 5% | 0.25 |
| 3 ms | 2.5% | 0.125 |

As shown in Table 1, the required percentage of the candidate resource in the resource set is 10% for the latency requirement of 10 ms. Alternatively, the required percentage can be obtained by a product of the default percentage 20% and a scaling factor 0.5, which is 10% (20%×0.5). It would be understood that the physical layer of mode 4 UE may receive these parameters from an eNB when it is in the coverage of the eNB, or from the higher layer thereof such as by manually input.

Other steps from S404 to S408 are similar with steps of S303 and S307, respectively, except that the default percentage 20% is replaced by a dynamic percentage P according to the latency requirement for packets, therefore the description thereof are omitted for the purpose of brevity.

Additionally, in S408, the mode 4 UE may reports a used percentage of the candidate resource in the resource set to a higher layer thereof besides the candidate resource. And the higher layer of the mode 4 UE may set transmission parameters, such as MCS, transmission power and number of retransmissions based on the used percentage of the candidate resource in the resource set.

It would be understood that the percentage of the candidate resource in the resource set is determined according to the latency requirement for the packets to be transmitted on SL. In that way, the latency between the time when packets arrive at Layer 1 and the time when resource is selected can be reduced for packets with smaller size.

Figure 5:
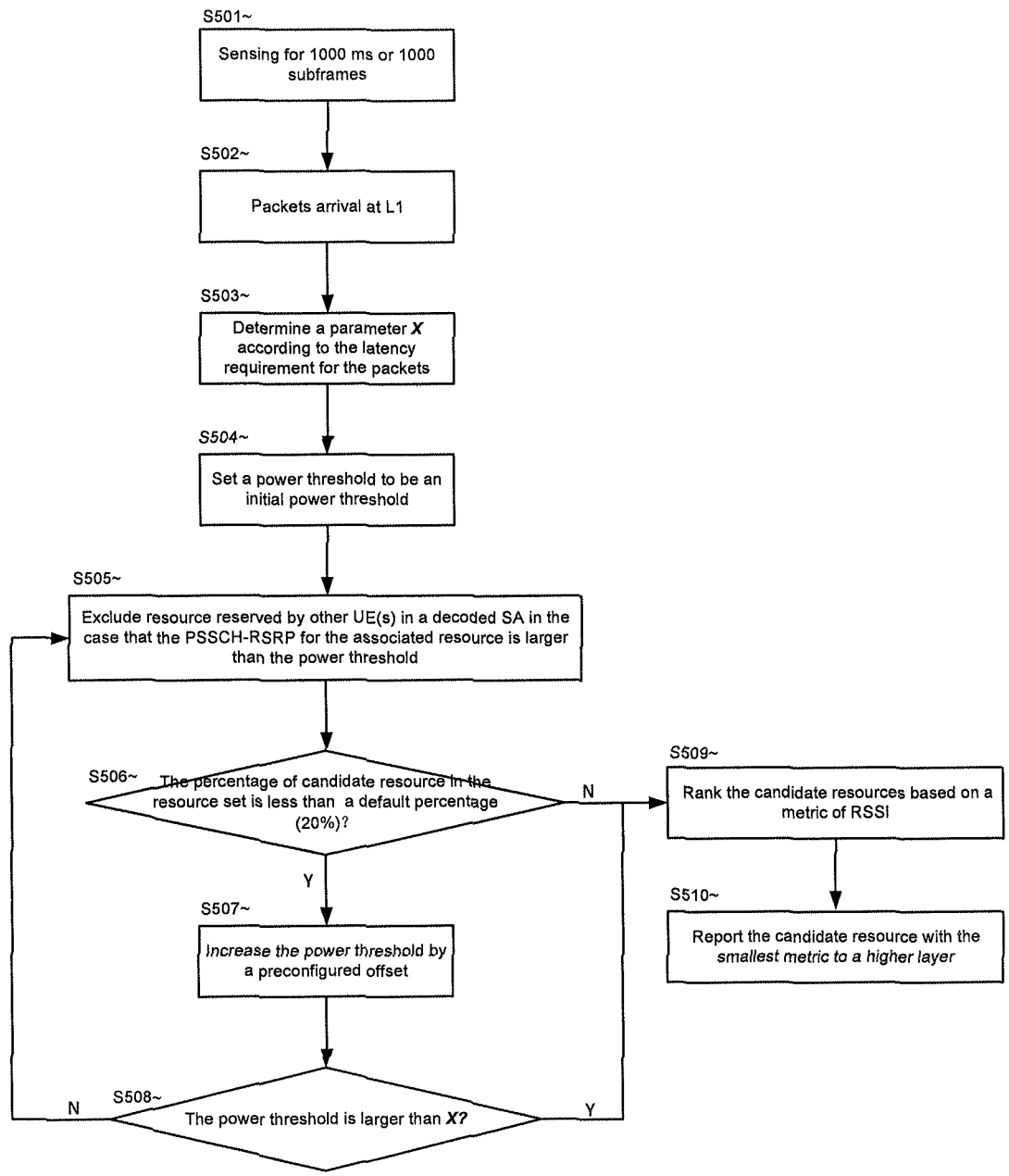
FIG. 5 is a call flow illustrating a selection of candidate resource according to the third embodiment.

FIG. 5 is a call flow illustrating a selection of candidate resource according to the third embodiment. Steps of S501 and S502 are similar with steps of S301 and S302, respectively, therefore the description thereof are omitted for the purpose of brevity.

In S503, the mode 4 UE determines a parameter X, which is a maximum power threshold of interference signal, according to the latency requirement for the packets to be transmitted on SL. The longer the required latency is, the larger the parameter X is, that is because more candidate resource which is more tolerant to interference signal can be selected for a longer required latency. It would be understood that the physical layer of mode 4 UE may receive these parameters from an eNB when it is in the coverage the eNB, or from the higher layer thereof such as by manually input.

In S504, the mode 4 UE sets a power threshold to be an initial power threshold which may be preconfigured.

In S505, the UE learns reserved resource for other UE(s) from a decoded SA, which has a collision with the resource set in the time interval $[n+T_1, \ldots, n+T_2]$. The mode 4 UE then deduces the power impact of the interference signal in the reserved resource from the PSSCH-RSRP for the associated resource in the time interval [n−1000, n−999, . . . , n−1], according to the predefined mapping relationship between the sensing and resource (re)selection window. In the case that the PSSCH-RSRP for the associated resource is larger than the initial power threshold such as 5 dB, the UE excludes the reserved resource for other UE(s) from the resource set in the (re)selection window.

In S506, if the percentage of candidate resource in the resource set is less than a default percentage such as 20% after the exclusion (Y in S506), the procedure continues to S507, wherein, the power threshold is increased by a pre-configured offset such as 3 dB.

In S508, the mode 4 UE decides if the power threshold is larger than X. If Y is S508, which means the maximum power threshold of interference signal corresponding to the latency requirement for the packets is reached, the procedure continues to S509, wherein, the mode 4 UE ranks the candidate resources in the resource set based on the measured strength of the signal in the associated resources in sensing window, such as a metric of RSSI. S509 is followed by S510, wherein, the physical layer of mode 4 UE reports the candidate resource with the smallest metric to a higher layer.

If N is S508, the procedure returns back to S505, wherein, the UE excludes the reserved resource for other UE(s) from the resource set in the (re)selection window in the case that the PSSCH-RSRP for the associated resource in the sensing window is larger than the increased power threshold. In S506, the UE decides again if the percentage of candidate resource in the resource set is less than the default percentage after the exclusion.

In response to the percentage of the candidate resource in the resource set having not reached the default percentage, the power threshold is increased until the default percentage is reached. When the default percentage is reached (N in S506), the procedure continues to S509 and then S510, the description of which have been described above.

Additionally, in S510, the mode 4 UE may reports a finally used power threshold of interference signal to a higher layer thereof besides the candidate resource. For example, the finally used power threshold of interference signal is less than the maximum power threshold of interference signal in the case that the default percentage is reached earlier than the maximum power threshold of interference signal. The higher layer of the mode 4 UE may set transmission parameters, such as MCS, transmission power and number of retransmissions based on the finally used power threshold of interference signal.

It would be understood that the mode 4 UE may stop excluding resource from the resource set for packets transmission on SL in response to one of the default percentage and the maximum power threshold of interference signal being reached. In that way, the resource which may be intolerant to the interference signal can be excluded from the resource set.

Figure 6:
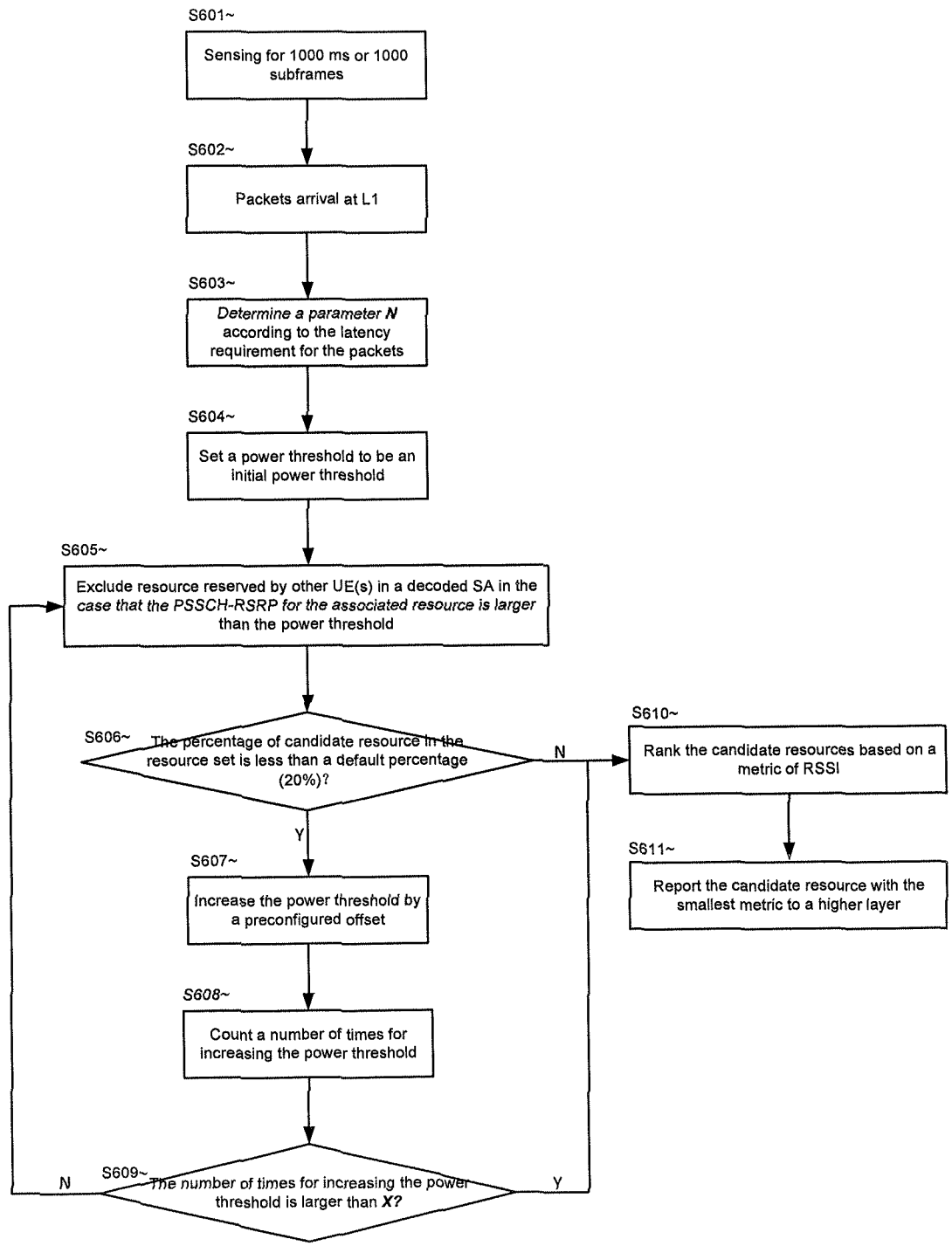
FIG. 6 is a call flow illustrating a selection of candidate resource according to the fourth embodiment.

FIG. 6 is a call flow illustrating a selection of candidate resource according to the fourth embodiment. The implementation in FIG. 6 is similar with that in FIG. 5, except that the maximum power threshold of interference signal is replaced by the maximum number of times for increasing power threshold of interference signal in FIG. 6. Steps of S601 and S602 are similar with steps of S301 and S302, respectively, therefore the description thereof are omitted for the purpose of brevity.

In S603, the mode 4 UE determines a parameter N, which is a maximum number of times for increasing power threshold of interference signal, according to the latency requirement for the packets to be transmitted on SL. The longer the required latency is, the larger the parameter N is, that is because more candidate resource which is more tolerant for interference signal can be selected for a longer required latency. According to another embodiment, the maximum number of times for increasing power threshold of interference signal is determined by a default number of times and a scaling factor for number of times corresponding to the latency requirement for the packets. For example, the maximum number of times is a product of the default number of times such as 16 and the scaling factor for number of times which is referred as x. Table 2 is an example of the values for X and x for different values for the required latency.

TABLE 2

The Maximum Number of Times vs. Latency Requirement

| latency requirement | maximum number of times for increasing power threshold of interference signal (N) | Scaling factor for number of times (n): default number of times = 16 |
|---|---|---|
| 20 ms | 16 | 1 |
| 10 ms | 8 | 0.5 |
| 5 ms | 4 | 0.25 |
| 3 ms | 2 | 0.125 |

As shown in Table 2, the maximum number of times for increasing power threshold of interference signal is 8 for the latency requirement of 10 ms. Alternatively, the maximum number of times can be obtained by a product of the default number of times 16 and a scaling factor 0.5, which is 8 (16×0.5). It would be understood that the physical layer of mode 4 UE may receive these parameters from an eNB when it is in the coverage of the eNB, or from the higher layer thereof such as by manually input.

Steps of S604 and S607 are similar with steps of S504 and S507, respectively, therefore the description thereof are omitted for the purpose of brevity.

In S608, the mode 4 UE counts a number of times for increasing the power threshold.

In S609, the mode 4 UE decides if the number of times for increasing the power threshold is larger than N. If Y is S609, which means the maximum number of times for increasing the power threshold corresponding to the latency requirement for the packets is reached, the procedure continues to S610, wherein, the mode 4 UE ranks the candidate resources in the resource set based on the measured strength of the signal in the associated resources in sensing window, such as a metric of RSSI. S610 is followed by S611, wherein, the physical layer of mode 4 UE reports the candidate resource with the smallest metric to a higher layer.

If N is S609, the procedure returns back to S605, wherein, the UE excludes the reserved resource for other UE(s) from the resource set in the (re)selection window in the case that the PSSCH-RSRP for the associated resource in the sensing window is larger than the increased power threshold. In S606, the UE decides again if the percentage of candidate resource in the resource set is less than the default percentage after the exclusion.

In response to the percentage of the candidate resource in the resource set having not reached the default percentage, the power threshold is increased until the default percentage is reached. When the default percentage is reached (N in S606), the procedure continues to S610 and then S611, the description of which have been described above.

Additionally, in S611, the mode 4 UE may reports a finally used number of times for increasing the power threshold to a higher layer thereof besides the candidate resource. For example, the finally used number of times for increasing the power threshold is less than the maximum number of times for increasing the power threshold in the case that the default percentage is reached earlier than the maximum number of times for increasing the power threshold. The higher layer of the mode 4 UE may set transmission parameters, such as MCS, transmission power and number of retransmissions based on the finally used number of times for increasing the power threshold.

It would be understood that, the mode 4 UE may stop excluding resource from the resource set for packets transmission on SL in response to one of the default percentage and the maximum number of times for increasing the power threshold being reached. In that way, the resource which may be intolerant to the interference signal can be excluded from the resource set.

Figure 7:
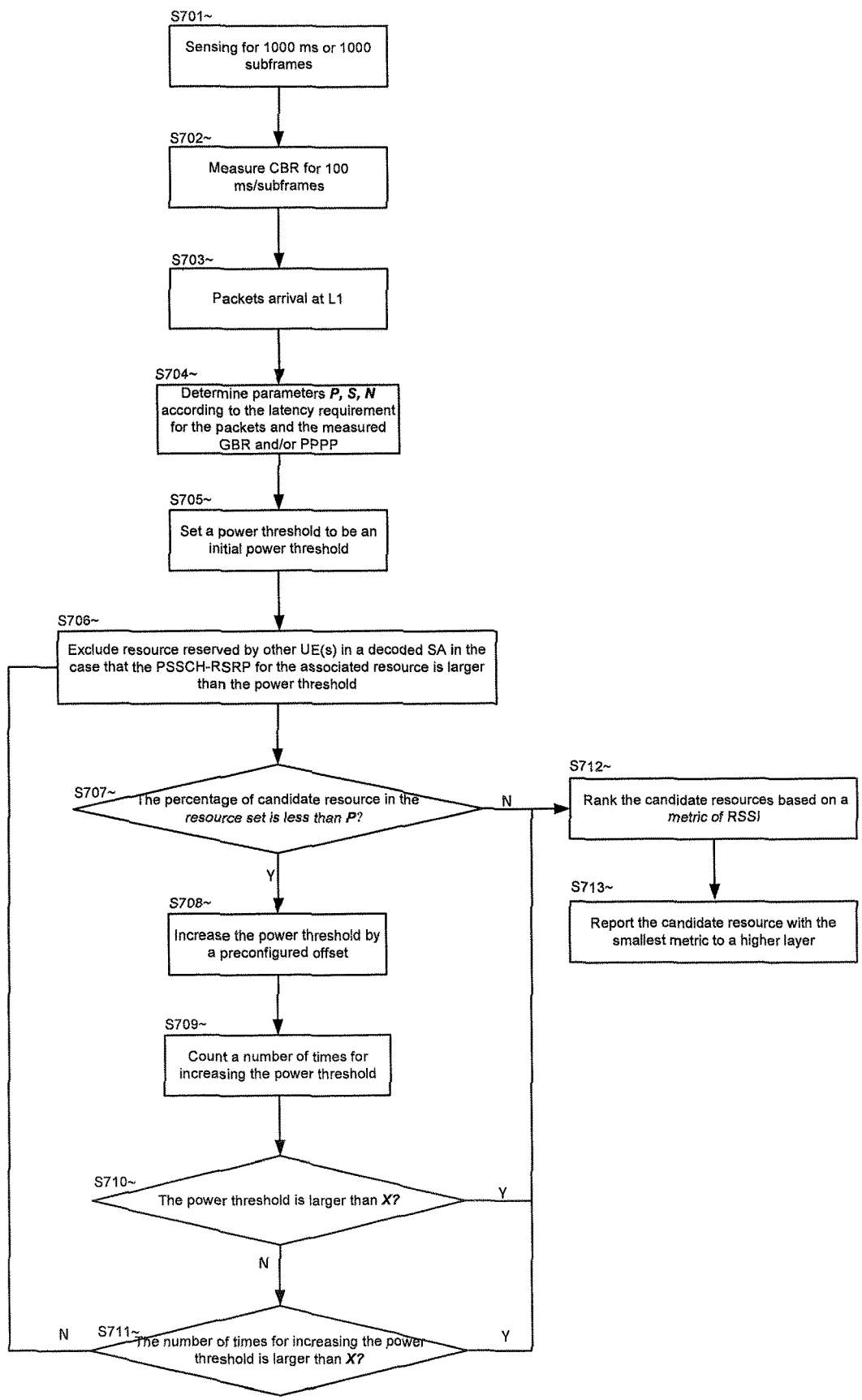
FIG. 7 is a call flow illustrating a selection of candidate resource according to the fifth embodiment.

FIG. 7 is a call flow illustrating a selection of candidate resource according to the fifth embodiment. The implementation in FIG. 7 supports the latency reduction by applying the combination of the required percentage of the candidate resource in the resource set, the maximum power threshold of interference signal, and the maximum number of times for increasing power threshold of interference signal. Further, the implementation in FIG. 7 considers CBR and/or PPPP for SL transmission of the mode 4 UE in the determination of the values for the parameters, along with the latency requirement for the packets to be transmitted on SL.

In S701, the mode 4 UE keeps sensing for 1000 ms or 1000 subframes.

In S702, the mode 4 UE monitors subframes [n−100, . . . , n−1] (or time interval [n−100, . . . , n−1] in milliseconds) to learn CBR which reflects the extent of channel busy. Take PSSCH as an example, the ratio of subframes, S-RSSI on which measured in the sub-channels for PSSCH exceeds a preconfigured threshold, against all of the subframes [n−100, . . . , n−1] is defined as the CBR of PSSCH. In the case that PSCCH is transmitted with the corresponding PSCCH in adjacent resource blocks, the CBR of PSCCH can be deduced from that of PSSCH. In the case that PSCCH is transmitted with the corresponding PSCCH in non-adjacent resource blocks, the CBR of PSCCH can be measured in a similar way with the measurement for CBR of PSSCH. That is, the ratio of subframes, S-RSSI on which measured in the sub-channels for PSCCH exceeds a preconfigured threshold, against all of the subframes [n−100, . . . , n−1] is defined as the CBR of PSCCH.

Additionally, the mode 4 UE determines PPPP for SL transmission thereof.

In S703, the physical layer of the mode 4 UE receives a request for data transmission from the higher layer thereof.

In S704, the mode 4 UE determines at least one of parameters P, X, N, which are defined as above, according to the latency requirement for the packets to be transmitted on SL as well as CBR and/or PPPP for SL transmission of the mode 4 UE. As described above, the longer the required latency is, the larger the parameters P, X, N are. Similar, according to another embodiment, the required percentage of the candidate resource in the resource set may be determined by a default percentage and a scaling factor for percentage corresponding to the latency requirement for the packets, and the maximum number of times for increasing power threshold of interference signal may be determined by a default number of times and a scaling factor for number of times corresponding to the latency requirement for the packets.

Table 3 is an example of the combinations of parameters vs. the combination of required latency, CBR and PPPP.

TABLE 2

Combinations of Parameters vs. Combination of Latency Requirement, CBR and PPPP

| Index | latency requirement | CBR | PPPP(in decimal) | P | X | N |
|---|---|---|---|---|---|---|
| 0 | 20 ms | N/A | N/A | 20% | 20 dB | 16 |
| 1 | 10 ms | ≤0.5 | 5-7 | 20% | 20 dB | 16 |
| 2 | 10 ms | ≤0.5 | 0-4 | 10% | 10 dB | 8 |
| 3 | 10 ms | >0.5 | 5-7 | 10% | 10 dB | 8 |
| 4 | 10 ms | >0.5 | 0-4 | 5% | 5 dB | 4 |
| 5 | 5 ms | ≤0.5 | 5-7 | 20% | 20 dB | 16 |
| 6 | 5 ms | ≤0.5 | 0-4 | 10% | 2.5 dB | 8 |
| 7 | 5 ms | >0.5 | 5-7 | 10% | 10 dB | 8 |
| 8 | 5 ms | >0.5 | 0-4 | 5% | 5 dB | 4 |

As shown in Table 3, take the indices 1~2 as examples, in the case that the measured CBR is less than 0.5 and PPPP for SL transmission thereof is from 5 to 7 in decimal, i.e. in the case of index 1, the required percentage of the candidate resource P in the resource set is 20%, the maximum power threshold of interference signal X is 20 dB, and the maximum number of times for increasing power threshold of interference signal N is 16. In another case that the measured CBR is less than 0.5 and PPPP for SL transmission thereof is from 0 to 4 in decimal, i.e. in the case of index 2, the required percentage of the candidate resource P in the resource set is 10%, the maximum power threshold of interference signal X is 10 dB, and the maximum number of times for increasing power threshold of interference signal N is 8. It would be understood that the physical layer of mode 4 UE may receive these parameters from an eNB when it is in the coverage of the eNB, or from the higher layer thereof such as by manually input.

In S705, the mode 4 UE sets a power threshold to be an initial power threshold which may be preconfigured.

In S706, the UE learns reserved resource for other UE(s) from a decoded SA, which has a collision with the resource set in the time interval [n+T$_1$, . . . , n+T$_2$]. The mode 4 UE then deduces the power impact of the interference signal in the reserved resource from the PSSCH-RSRP for the associated resource in the time interval [n−1000, n−999, . . . , n−1], according to the predefined mapping relationship between the sensing and resource (re)selection window. In the case that the PSSCH-RSRP for the associated resource is larger than the initial power threshold such as 5 dB, the UE excludes the reserved resource for other UE(s) from the resource set in the (re)selection window.

In S707, if the percentage of candidate resource in the resource set is less than the determined P after the exclusion (Y in S707), the procedure continues to S708, wherein, the power threshold is increased by a preconfigured offset such as 3 dB.

In S709, the mode 4 UE counts a number of times for increasing the power threshold.

In S710, the mode 4 UE decides if the power threshold is larger than X. If Y is S710, which means the maximum power threshold of interference signal corresponding to the latency requirement for the packets is reached, the procedure continues to S712, wherein, the mode 4 UE ranks the candidate resources in the resource set based on the measured strength of the signal in the associated resources in sensing window, such as a metric of RSSI. S712 is followed by S713, wherein, the physical layer of mode 4 UE reports the candidate resource with the smallest metric to a higher layer.

If N is S710, the mode 4 UE decides if the number of times for increasing the power threshold is larger than N in S711. If Y is S711, which means the maximum number of times for increasing the power threshold corresponding to the latency requirement for the packets is reached, the procedure continues to S711 and then S712, the description of which have been described above.

If Y is S711, the procedure returns back to S706, wherein, the UE excludes the reserved resource for other UE(s) from the resource set in the (re)selection window in the case that the PSSCH-RSRP for the associated resource in the sensing window is larger than the increased power threshold. In S712, the UE decides again if the percentage of candidate resource in the resource set is less than the determined P after the exclusion.

In response to the percentage of the candidate resource in the resource set having not reached the determined P, the power threshold is increased until it is reached. When the determined P is reached (N in S707), the procedure continues to S712 and then S713, the description of which have been described above.

It would be noted that parameters P, X, N are optional and so are the corresponding decision steps. Particularly, the mode 4 UE may any combinations of the three parameters P, X, N to exclude resources from a resource set for packets transmission on SL. For example, the mode 4 UE can apply the parameters P, X to the exclusion of the resource using steps of S707 and S710. or the parameters P, N to the exclusion of the resource using steps of S707 and S711, or the parameters X, N to the exclusion of the resource using steps of S710 and S711 and a default percentage such as 20%.

Additionally, it would be understood that the required percentage of the candidate resource in the resource set may be determined by a default percentage and a scaling factor for percentage corresponding to the latency requirement for the packets, and the maximum number of times for increasing power threshold of interference signal is determined by a default number of times and a scaling factor for number of times corresponding to the latency requirement for the packets, as described above.

Additionally, in S713, the mode 4 UE may reports at least one of a finally used percentage of the candidate resource in the resource set, a finally used power threshold of interference signal, a finally used number of times for increasing power threshold of interference signal and an index corresponding to a set of the determined parameters, to a higher layer thereof, besides the candidate resource. The higher layer of the mode 4 UE may set transmission parameters, such as MCS, transmission power and number of retransmissions based on at least one of the reported index, the used percentage of the candidate resource in the resource set, the used power threshold of interference signal and the used number of times for increasing power threshold of interference signal.

It would be understood that, the mode 4 UE may stop excluding resource from the resource set for packets transmission on SL in response to until one of the required percentage of the candidate resource in the resource set, the maximum power threshold of interference signal and/or the maximum number of times for increasing power threshold of interference signal is reached. In that way, the resource which may be intolerant to the interference signal can be excluded from the resource set. Meanwhile, the latency between the time when packets arrive at Layer 1 and the time when resource is selected can be reduced.

One skilled in the relevant art will recognize, however, that the process described from FIGS. 4 and 7 need not necessarily be practiced in the sequence shown in the Figures, and are able to be practiced without one or more of the specific steps, or with other steps not shown in the Figures.

Figure 8:
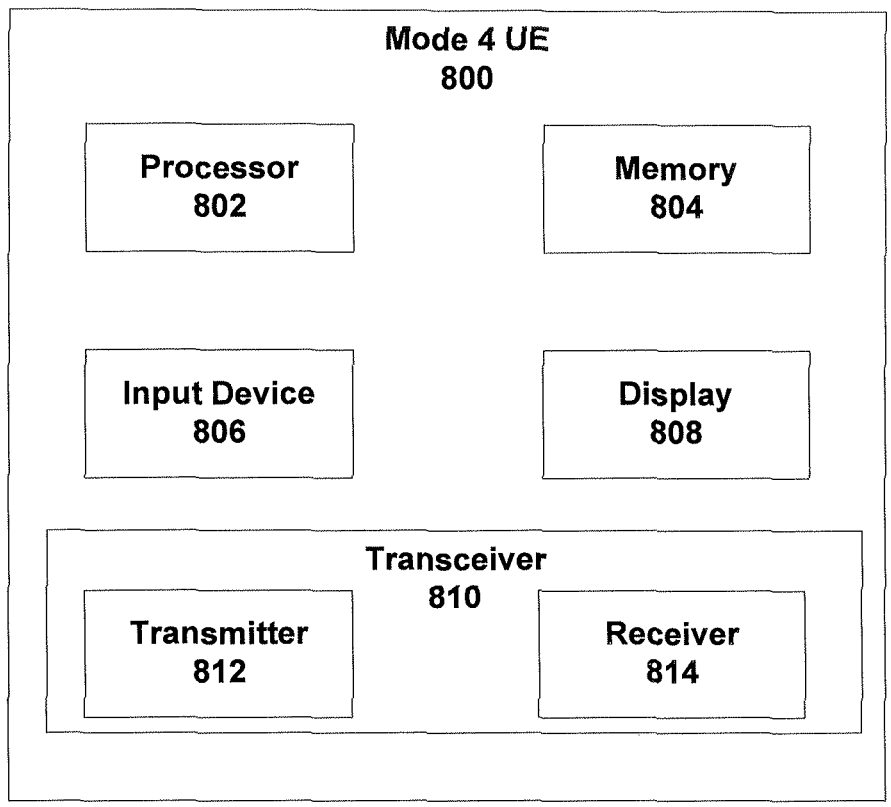
FIG. 8 is a schematic block diagram illustrating components of a mode 4 UE according to one embodiment.

FIG. 8 is a schematic block diagram illustrating components of a mode 4 UE according to one embodiment.

Mode 4 UE 800 is an embodiment of Mode 4 UE described from FIG. 3 to FIG. 7. Furthermore, Mode 4 UE 800 may include a processor 802, a memory 804, and a transceiver 810. In some embodiments, Mode 4 UE 800 may include an input device 806 and/or a display 808. In certain embodiments, the input device 806 and the display 808 may be combined into a single device, such as a touch screen.

The processor 802, in one embodiment, may include any known controller capable of executing computer-readable instructions and/or capable of performing logical operations. For example, the processor 802 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 802 executes instructions stored in the memory 804 to perform the methods and routines described herein. The processor 802 is communicatively coupled to the memory 804, the input device 806, the display 808, and the transceiver 810.

In some embodiments, the processor 802 controls the transceiver 810 to receive DL signals from Network Equipment 1100. For example, the processor 802 may control the transceiver 810 to receive the parameters P, X, N in RRC signaling from an eNB when it is in its coverage, as described above.

The memory 804, in one embodiment, is a computer readable storage medium. In some embodiments, the memory 804 includes volatile computer storage media. For example, the memory 804 may include a RAM, including dynamic RAM ("DRAM"), synchronous dynamic RAM ("SDRAM"), and/or static RAM ("SRAM"). In some embodiments, the memory 804 includes non-volatile computer storage media. For example, the memory 804 may include a hard disk drive, a flash memory, or any other suitable non-volatile computer storage device. In some embodiments, the memory 804 includes both volatile and non-volatile computer storage media. In some embodiments, the memory 804 stores parameters relating to different requirements for packets to be transmitted on SL. In some embodiments, the memory 804 also stores program code and related data, such as an operating system or other controller algorithms operating on Mode 4 UE 800.

Mode 4 UE 800 may optionally include an input device 806. The input device 806, in one embodiment, may include any known computer input device including a touch panel, a button, a keyboard, a stylus, a microphone, or the like. In some embodiments, the input device 806 may be integrated with the display 808, for example, as a touch screen or similar touch-sensitive display. In some embodiments, the input device 806 includes a touch screen such that text may be input using a virtual keyboard displayed on the touch screen and/or by handwriting on the touch screen. In some embodiments, the input device 806 includes two or more different devices, such as a keyboard and a touch panel. In certain embodiments, the input device 806 may include one or more sensors for monitoring an environment of Mode 4 UE 800.

Mode 4 UE 800 may optionally include a display 808. The display 808, in one embodiment, may include any known electronically controllable display or display device. The display 808 may be designed to output visual, audible, and/or haptic signals. In some embodiments, the display 808 includes an electronic display capable of outputting visual data to a user. For example, the display 808 may include, but is not limited to, an LCD display, an LED display, an OLED display, a projector, or a similar display device capable of outputting images, text, or the like to a user. As another, non-limiting, example, the display 808 may include a wearable display such as a smart watch, smart glasses, a heads-up display, or the like. Further, the display 808 may be a component of a smart phone, a personal digital assistant, a television, a table computer, a notebook (laptop) computer, a personal computer, a vehicle dashboard, or the like.

In certain embodiments, the display 808 may include one or more speakers for producing sound. For example, the display 808 may produce an audible alert or notification (e.g., a beep or chime). In some embodiments, the display 808 includes one or more haptic devices for producing vibrations, motion, or other haptic feedback. In some embodiments, all or portions of the display 808 may be integrated with the input device 806. For example, the input device 806 and display 808 may form a touch screen or similar touch-sensitive display. In other embodiments, the display 808 may be located near the input device 806.

The transceiver 810, in one embodiment, is configured to communicate wirelessly another Mode 4 UE. In certain embodiments, the transceiver 810 comprises a transmitter 812 and a receiver 814. The transmitter 812 is used to transmit SL communication signals to another Mode 4 UE and the receiver 814 is used to receive SL communication signals from another Mode 4 UE. For example, the receiver 814 may receive SA information indicating the reserved resource.

The transmitter 812 and the receiver 814 may be any suitable types of transmitters and receivers. Although only one transmitter 812 and one receiver 814 are illustrated, the transceiver 810 may have any suitable number of transmitters 812 and receivers 814. For example, in some embodiments, Mode 4 UE 800 includes a plurality of transmitter 812 and receiver 814 pairs for communicating on a plurality of wireless networks and/or radio frequency bands, each transmitter 812 and receiver 814 pair configured to communicate on a different wireless network and/or radio frequency band than the other transmitter 812 and receiver 814 pairs.

Figure 9:
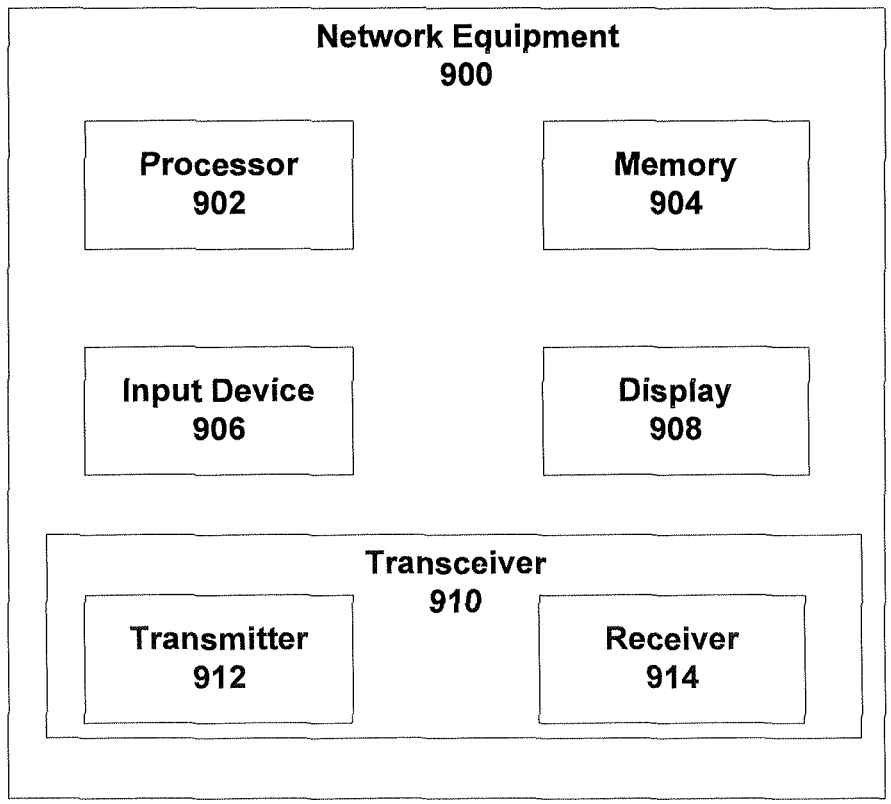
FIG. 9 is a schematic block diagram illustrating components of a network equipment according to one embodiment.

FIG. 9 is a schematic block diagram illustrating components of a network equipment according to one embodiment.

Network Equipment 900 includes one embodiment of eNB mentioned from FIG. 4 to FIG. 7. Furthermore, Network Equipment 900 may include a processor 902, a memory 904, an input device 906, a display 908, and a transceiver 910. As may be appreciated, the processor 902, the memory 904, the input device 906, and the display 908 may be substantially similar to the processor 902, the memory 904, the input device 906, and the display 908 of Mode 4 UE 800, respectively.

In some embodiments, the processor 902 controls the transceiver 910 to transmit DL signals to Mode 4 UE 800 when the Mode 4 UE 800 is in its coverage. For example, the processor 902 may control the transceiver 910 to transmit the parameters P, X, N in RRC signaling to Mode 4 UE 800 when the Mode 4 UE 800 is in its coverage, as described above.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that excludes resources from a resource set for packets transmission on sidelink based at least on parameters determined according to a latency requirement for the packets, wherein the parameters comprise a required percentage of a candidate resource in the resource set, a maximum power threshold of interference signal, and a maximum number of times for increasing power threshold of interference signal;
wherein the required percentage of the candidate resource in the resource set is determined by a default percentage and a scaling factor for percentage corresponding to the latency requirement for the packets.

2. The apparatus according to claim 1, wherein the maximum number of times for increasing power threshold of interference signal is determined by a default number of times and a scaling factor for number of times corresponding to the latency requirement for the packets.

3. The apparatus according to claim 1, wherein, in response to the percentage of the candidate resource in the resource set having not reached the required percentage, the power threshold of interference signal is increased until the maximum power threshold of interference signal or the maximum number of times for increasing power threshold of interference signal is reached.

4. The apparatus according to claim 1, wherein, in response to the percentage of the candidate resource in the resource set having not reached the required percentage, the power threshold of interference signal is increased until the required percentage of the candidate resource in the resource set or the maximum number of times for increasing interference power threshold of signal is reached.

5. The apparatus according to claim 1, wherein, in response to the percentage of the candidate resource in the resource set having not reached the required percentage, the power threshold of interference signal is increased until the required percentage of the candidate resource in the resource set or the maximum power threshold of interference signal is reached.

6. The apparatus according to claim 1, wherein, in response to the percentage of the candidate resource in the resource set having not reached the required percentage, the power threshold of interference signal is increased until one of the required percentage of the candidate resource in the resource set, the maximum power threshold of interference signal and/or the maximum number of times for increasing power threshold of interference signal is reached.

7. The apparatus according to claim 1, wherein the parameters are further determined based on at least one of Channel Busy Ratio and ProSe Per Packet Priority.

8. The apparatus according to claim 1, wherein the parameters are preconfigured by a network equipment or a higher layer of the apparatus.

9. A method comprising:
excluding resources from a resource set for packets transmission on sidelink based at least on parameters determined according to a latency requirement for the packets, wherein the parameters comprise a required percentage of a candidate resource in the resource set, a maximum power threshold of interference signal, and a maximum number of times for increasing power threshold of interference signal;

wherein the required percentage of the candidate resource in the resource set is determined by a default percentage and a scaling factor for percentage corresponding to the latency requirement for the packets.

10. The method according to claim 9, wherein the maximum number of times for increasing power threshold of interference signal is determined by a default number of times and a scaling factor for number of times corresponding to the latency requirement for the packets.

11. The method according to claim 9, wherein, in response to the percentage of the candidate resource in the resource set having not reached the required percentage, the power threshold of interference signal is increased until the maximum power threshold of interference signal or the maximum number of times for increasing power threshold of interference signal is reached.

12. The method according to claim 9, wherein, in response to the percentage of the candidate resource in the resource set having not reached the required percentage, the power threshold of interference signal is increased until the required percentage of the candidate resource in the resource set or the maximum number of times for increasing interference power threshold of signal is reached.

13. The method according to claim 9, wherein, in response to the percentage of the candidate resource in the resource set having not reached the required percentage, the power threshold of interference signal is increased until the required percentage of the candidate resource in the resource set or the maximum power threshold of interference signal is reached.

14. The method according to claim 9, wherein, in response to the percentage of the candidate resource in the resource set having not reached the required percentage, the allowed power of interference signal is increased until one of the required percentage of the candidate resource in the resource set, the maximum power threshold of interference signal and/or the maximum number of times for increasing power threshold of interference signal is reached.

15. The method according to claim 9, wherein the parameters are further determined based on at least one of Channel Busy Ratio and ProSe Per Packet Priority.

16. The method according to claim 9, further comprises reporting at least one of the candidate resource, a used percentage of the candidate resource in the resource set, a used power threshold of interference signal, a used number of times for increasing power threshold of interference signal and an index corresponding to a set of the determined parameters, to a higher layer.

17. The method according to claim 16, further comprises setting transmission parameters, including at least one of Modulation and Coding Scheme, transmission power and number of retransmissions, by the higher layer based on at least one of the reported index, a used percentage of the candidate resource in the resource set, a used power threshold of interference signal and a used number of times for increasing power threshold of interference signal.

18. An apparatus comprising:

a transceiver that transmits parameters to a user equipment which correspond to a latency requirement for excluding resources from a resource set for packets transmission on sidelink and comprises a required percentage of a candidate resource in the resource set, a maximum power threshold of interference signal, and a maximum number of times for increasing power threshold of interference signal;

wherein the required percentage of the candidate resource in the resource set is determined by a default percentage and a scaling factor for percentage corresponding to the latency requirement for the packets.

* * * * *